United States Patent
Song

(10) Patent No.: US 10,509,602 B2
(45) Date of Patent: Dec. 17, 2019

(54) DATA STORAGE DEVICE AND OPERATING METHOD THEREOF

(71) Applicant: SK hynix Inc., Gyeonggi-do (KR)

(72) Inventor: Kwang Jong Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 530 days.

(21) Appl. No.: 15/195,462

(22) Filed: Jun. 28, 2016

(65) Prior Publication Data

US 2017/0262173 A1  Sep. 14, 2017

(30) Foreign Application Priority Data

Mar. 10, 2016  (KR) .................. 10-2016-0028781

(51) Int. Cl.
*G06F 3/06* (2006.01)

(52) U.S. Cl.
CPC .... *G06F 3/0679* (2013.01); *G06F 2212/7201* (2013.01)

(58) Field of Classification Search
CPC ...... G06F 1/3225; G06F 12/0246; G06F 1/08; G06F 1/324; G06F 1/3275; G06F 1/3287; G06F 2212/7201; G06F 3/0604; G06F 3/0653; G06F 3/0679
See application file for complete search history.

(56) References Cited

U.S. PATENT DOCUMENTS

| | | | | |
|---|---|---|---|---|
| 2007/0300037 A1* | 12/2007 | Rogers | ............... | G06F 12/0292 711/202 |
| 2009/0240870 A1* | 9/2009 | Kinoshita | ........... | G06F 12/0246 711/103 |
| 2015/0254458 A1* | 9/2015 | Hong | ..................... | G06F 21/57 726/22 |
| 2017/0024137 A1* | 1/2017 | Kanno | ................. | G06F 3/0604 |

FOREIGN PATENT DOCUMENTS

KR    1020120037218    4/2012

* cited by examiner

*Primary Examiner* — Tuan V Thai
(74) *Attorney, Agent, or Firm* — IP & T Group LLP

(57) ABSTRACT

A data storage device includes a nonvolatile memory device including a main map table, the main map table including a plurality of map segments; and a controller comprising a sub map table including only some of the plurality of map segments of the main map table, the controller is suitable for updating access frequencies for the respective map segments of the main map table; and for determining whether to erase a map segment of the sub map table based on the updated access frequencies for the respective map segments.

18 Claims, 11 Drawing Sheets

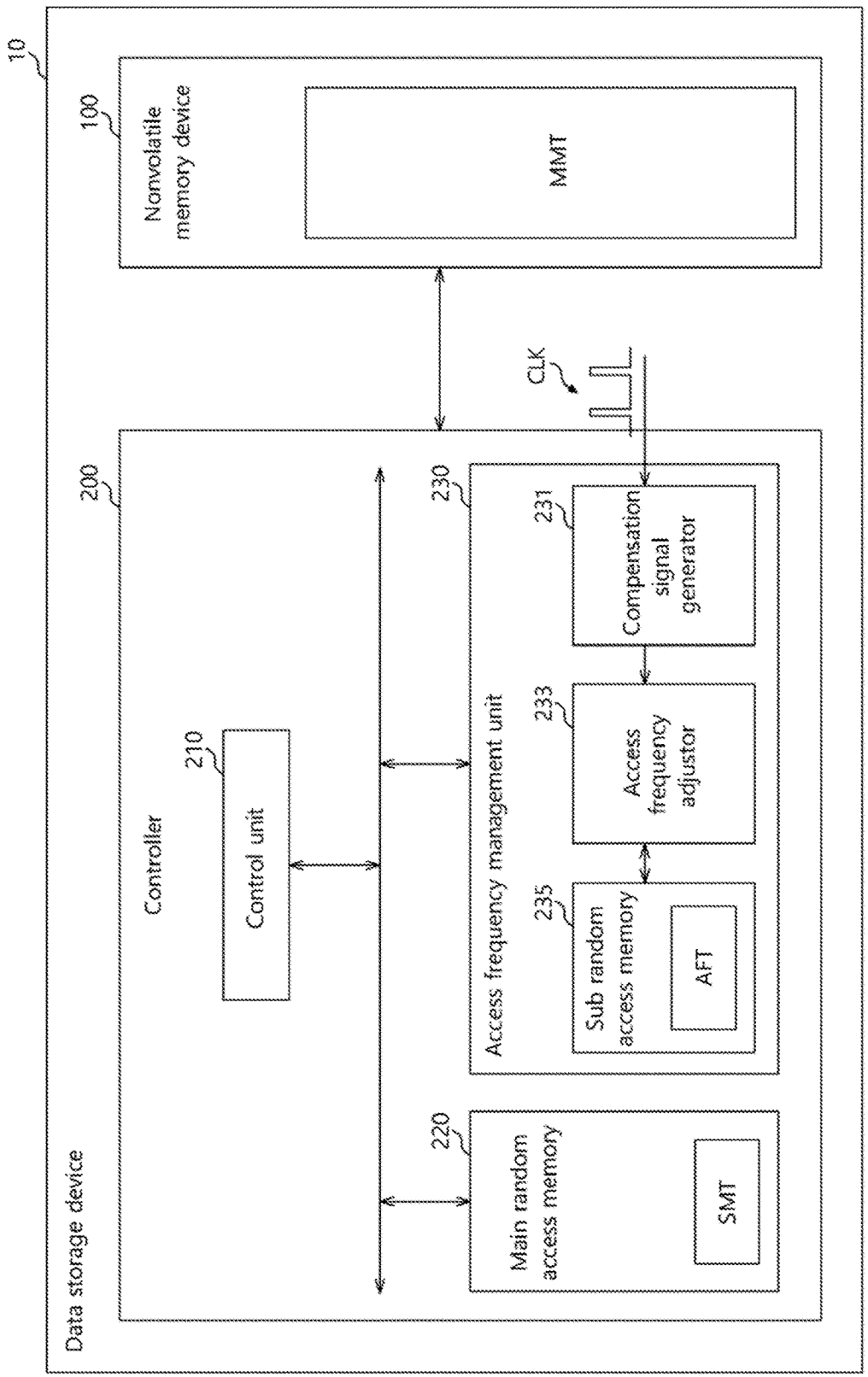

FIG.2

Main map table (MMT)

| Segment | Address mapping information | | | | |
|---|---|---|---|---|---|
| MTSG0 | L2P(1) | L2P(2) | L2P(3) | ••• | L2P(k) |
| MTSG1 | L2P(k+1) | L2P(k+2) | L2P(k+3) | ••• | L2P(2k) |
| MTSG2 | L2P(2k+1) | L2P(2k+2) | L2P(2k+3) | ••• | L2P(3k) |
| MTSG3 | L2P(3k+1) | L2P(3k+2) | L2P(3k+3) | ••• | L2P(4k) |
| MTSG4 | L2P(4k+1) | L2P(4k+2) | L2P(4k+3) | ••• | L2P(5k) |
| MTSG5 | L2P(5k+1) | L2P(5k+2) | L2P(5k+3) | ••• | L2P(6k) |
| MTSG6 | L2P(6k+1) | L2P(6k+2) | L2P(6k+3) | ••• | L2P(7k) |
| MTSG7 | L2P(7k+1) | L2P(7k+2) | L2P(7k+3) | ••• | L2P(8k) |
| MTSG8 | L2P(8k+1) | L2P(8k+2) | L2P(8k+3) | ••• | L2P(9k) |
| MTSG9 | L2P(9k+1) | L2P(9k+2) | L2P(9k+3) | ••• | L2P(10k) |
| MTSG10 | L2P(10k+1) | L2P(10k+2) | L2P(10k+3) | ••• | L2P(11k) |
| MTSG11 | L2P(11k+1) | L2P(11k+2) | L2P(11k+3) | ••• | L2P(12k) |
| MTSG12 | L2P(12k+1) | L2P(12k+2) | L2P(12k+3) | ••• | L2P(13k) |
| MTSG13 | L2P(13k+1) | L2P(13k+2) | L2P(13k+3) | ••• | L2P(14k) |
| MTSG14 | L2P(14k+1) | L2P(14k+2) | L2P(14k+3) | ••• | L2P(15k) |
| MTSG15 | L2P(15k+1) | L2P(15k+2) | L2P(15k+3) | ••• | L2P(16k) |
| MTSG16 | L2P(16k+1) | L2P(16k+2) | L2P(16k+3) | ••• | L2P(17k) |
| MTSG17 | L2P(17k+1) | L2P(17k+2) | L2P(17k+3) | ••• | L2P(18k) |
| MTSG18 | L2P(18k+1) | L2P(18k+2) | L2P(18k+3) | ••• | L2P(19k) |
| MTSG19 | L2P(19k+1) | L2P(19k+2) | L2P(19k+3) | ••• | L2P(20k) |

FIG.3

Sub map table (SMT)

| Segment | Address mapping information | | | | |
|---|---|---|---|---|---|
| MTSG3 | L2P(3k+1) | L2P(3k+2) | L2P(3k+3) | ••• | L2P(4k) |
| MTSG4 | L2P(4k+1) | L2P(4k+2) | L2P(4k+3) | ••• | L2P(5k) |
| MTSG5 | L2P(5k+1) | L2P(5k+2) | L2P(5k+3) | ••• | L2P(6k) |
| MTSG6 | L2P(6k+1) | L2P(6k+2) | L2P(6k+3) | ••• | L2P(7k) |
| MTSG7 | L2P(7k+1) | L2P(7k+2) | L2P(7k+3) | ••• | L2P(8k) |

FIG.4

Access frequency table (AFT)

| Segment | Access frequency |
|---|---|
| MTSG0 | 0 |
| MTSG1 | 0 |
| MTSG2 | 0 |
| MTSG3 | 0 |
| MTSG4 | 0 |
| MTSG5 | 0 |
| MTSG6 | 0 |
| MTSG7 | 0 |
| MTSG8 | 0 |
| MTSG9 | 0 |
| MTSG10 | 0 |
| MTSG11 | 1 |
| MTSG12 | 5 |
| MTSG13 | 6 |
| MTSG14 | 4 |
| MTSG15 | 3 |
| MTSG16 | 0 |
| MTSG17 | 0 |
| MTSG18 | 0 |
| MTSG19 | 0 |

FIG.5

| index | Time | LBA | | | | | | | | | | | | | | | |
|---|---|---|---|---|---|---|---|---|---|---|---|---|---|---|---|---|---|
| | | 10k+n | | 8k+n | | | | 12k+n | 13k+n | 14k+n | 15k+n | 12k+n | | | | | |
| | Tick | 1 | | | | | 1 | | | | | 1 | | | | | 1 |
| | | T+0 | T+1 | T+2 | T+3 | T+4 | T+5 | T+6 | T+7 | T+8 | T+9 | T+10 | T+11 | T+12 | T+13 | T+14 | T+15 |
| 0 | | 0 | 0 | 0 | 0 | 0 | 0 | 0 | 0 | 0 | 0 | 0 | 0 | 0 | 0 | 0 | 0 |
| 1 | | 0 | 0 | 0 | 0 | 0 | 0 | 0 | 0 | 0 | 0 | 0 | 0 | 0 | 0 | 0 | 0 |
| 2 | | 0 | 0 | 0 | 0 | 0 | 0 | 0 | 0 | 0 | 0 | 0 | 0 | 0 | 0 | 0 | 0 |
| 3 | | 0 | 0 | 0 | 0 | 0 | 0 | 0 | 0 | 0 | 0 | 0 | 0 | 0 | 0 | 0 | 0 |
| 4 | | 0 | 0 | 0 | 0 | 0 | 0 | 0 | 0 | 0 | 0 | 0 | 0 | 0 | 0 | 0 | 0 |
| 5 | | 0 | 0 | 0 | 0 | 0 | 0 | 0 | 0 | 0 | 0 | 0 | 0 | 0 | 0 | 0 | 0 |
| 6 | | 0 | 0 | 0 | 0 | 0 | 0 | 0 | 0 | 0 | 0 | 0 | 0 | 0 | 0 | 0 | 0 |
| 7 | | 0 | 1 | 1 | 1 | 1 | 2 | 2 | 2 | 2 | 2 | 1 | 1 | 1 | 1 | 1 | 0 |
| 8 | | 0 | 3 | 3 | 3 | 3 | 2 | 2 | 2 | 2 | 2 | 1 | 1 | 1 | 1 | 1 | 0 |
| 9 | | 0 | 2 | 2 | 2 | 2 | 1 | 3 | 4 | 4 | 4 | 1 | 1 | 1 | 1 | 1 | 0 |
| 10 | | 0 | 0 | 0 | 0 | 0 | 0 | 2 | 5 | 6 | 6 | 3 | 2 | 2 | 2 | 2 | 0 |
| 11 | | 0 | 0 | 0 | 0 | 0 | 0 | 0 | 2 | 5 | 6 | 5 | 6 | 6 | 6 | 6 | 1 |
| 12 | | 0 | 0 | 0 | 0 | 0 | 0 | 0 | 0 | 2 | 5 | 5 | 7 | 7 | 7 | 7 | 5 |
| 13 | | 0 | 0 | 0 | 0 | 0 | 0 | 0 | 0 | 0 | 2 | 4 | 5 | 5 | 5 | 5 | 6 |
| 14 | | 0 | 0 | 0 | 0 | 0 | 0 | 0 | 0 | 0 | 0 | 1 | 4 | 4 | 4 | 4 | 4 |
| 15 | | 0 | 0 | 0 | 0 | 0 | 0 | 0 | 0 | 0 | 0 | 0 | 1 | 1 | 1 | 1 | 3 |
| 16 | | 0 | 0 | 0 | 0 | 0 | 0 | 0 | 0 | 0 | 0 | 0 | 0 | 0 | 0 | 0 | 0 |
| 17 | | 0 | 0 | 0 | 0 | 0 | 0 | 0 | 0 | 0 | 0 | 0 | 0 | 0 | 0 | 0 | 0 |
| 18 | | 0 | 0 | 0 | 0 | 0 | 0 | 0 | 0 | 0 | 0 | 0 | 0 | 0 | 0 | 0 | 0 |
| 19 | | 0 | 0 | 0 | 0 | 0 | 0 | 0 | 0 | 0 | 0 | 0 | 0 | 0 | 0 | 0 | 0 |

DATA STORAGE DEVICE AND OPERATING METHOD THEREOF

CROSS-REFERENCES TO RELATED APPLICATION

The present application claims priority under 35 U.S.C. § 119(a) to Korean application number 10-2016-0028781, filed on Mar. 10, 2016, in the Korean Intellectual Property Office, which is incorporated herein by reference in its entirety.

BACKGROUND

1. Technical Field

Various embodiments generally relate to a semiconductor device and, more particularly, to a data storage device and an operating method thereof.

2. Related Art

Recently, the paradigm for the computer environment has been converted into ubiquitous computing so that computer systems can be used anytime and anywhere. Due to this, use of portable electronic devices such as, for example, mobile phones, digital cameras, and notebook computers has rapidly increased. In general, such portable electronic devices use a data storage device which uses a memory device. The data storage device is used as an auxiliary memory device of the portable electronic devices.

A data storage device using a memory device provides advantages in that, since there is no mechanical driving part, stability and durability are excellent, an information access speed is high and power consumption is small. Data storage devices having such advantages include a universal serial bus (USB) memory device, memory cards having various interfaces, and a solid state drive (SSD).

As portable electronic devices play a large file such as, for example, music file or video file, the data storage device is required to have a large storage capacity. The data storage device uses, as a storage medium, a memory device having a high integration degree of memory cells to secure a large storage capacity, for example, a flash memory device which is one of nonvolatile memory devices.

SUMMARY

Various embodiments are directed to a data storage device capable of more efficiently managing map table segments of high access request possibilities, and an operating method thereof.

In an embodiment, a data storage device may include: a nonvolatile memory device including a main map table, the main map table including a plurality of map segments; and a controller comprising a sub map table including only some of the plurality of map segments of the main map table, the controller is suitable for updating access frequencies for the respective map segments of the main map table; and for determining whether to erase a map segment of the sub map table based on the updated access frequencies for the respective map segments.

In an embodiment, a data storage device may include: a nonvolatile memory device including a main map table including a plurality of map segments; a control unit suitable for controlling the nonvolatile memory device according to a request received from a host device; a main random access memory including a sub map table including some map segments among the plurality of map segments of the main map table; and an access frequency management unit suitable for updating access frequencies for the plurality of map segments of the main map table, wherein the control unit determines whether to erase, for map segments of the sub map table based on access frequencies for the respective map segments.

In an embodiment, a method for operating a data storage device including a nonvolatile memory device which includes a main map table including a plurality of map segments and a controller which controls the nonvolatile memory device may include: determining whether an access is requested from a host device; and updating access frequencies for the plurality of map segments, among the plurality of map table segments, when the access is requested from the host device.

According to the embodiments, access frequencies for a plurality of respective map table segments constructing a map table may be updated in real time according to an access request from a host device, and map table segments of high access request possibilities may be loaded in a random access memory by referring to the access frequencies updated in real time, whereby it is possible to quickly respond to the access request from the host device.

BRIEF DESCRIPTION OF THE DRAWINGS

FIG. 1 is a block diagram illustrating a data storage device, according to an embodiment of the present invention.

FIG. 2 is a diagram illustrating a main map table in the nonvolatile memory device of FIG. 1, according to an embodiment of the present invention.

FIG. 3 is a diagram illustrating a sub map table in the main random access memory of FIG. 1, according to an embodiment of the present invention.

FIG. 4 is a diagram illustrating an access frequency table in the sub random access memory of FIG. 1, according to an embodiment of the present invention.

FIG. 5 is a diagram illustrating a process of updating access frequencies of map table segments, according to an embodiment of the present invention.

DETAILED DESCRIPTION

Figure 6:
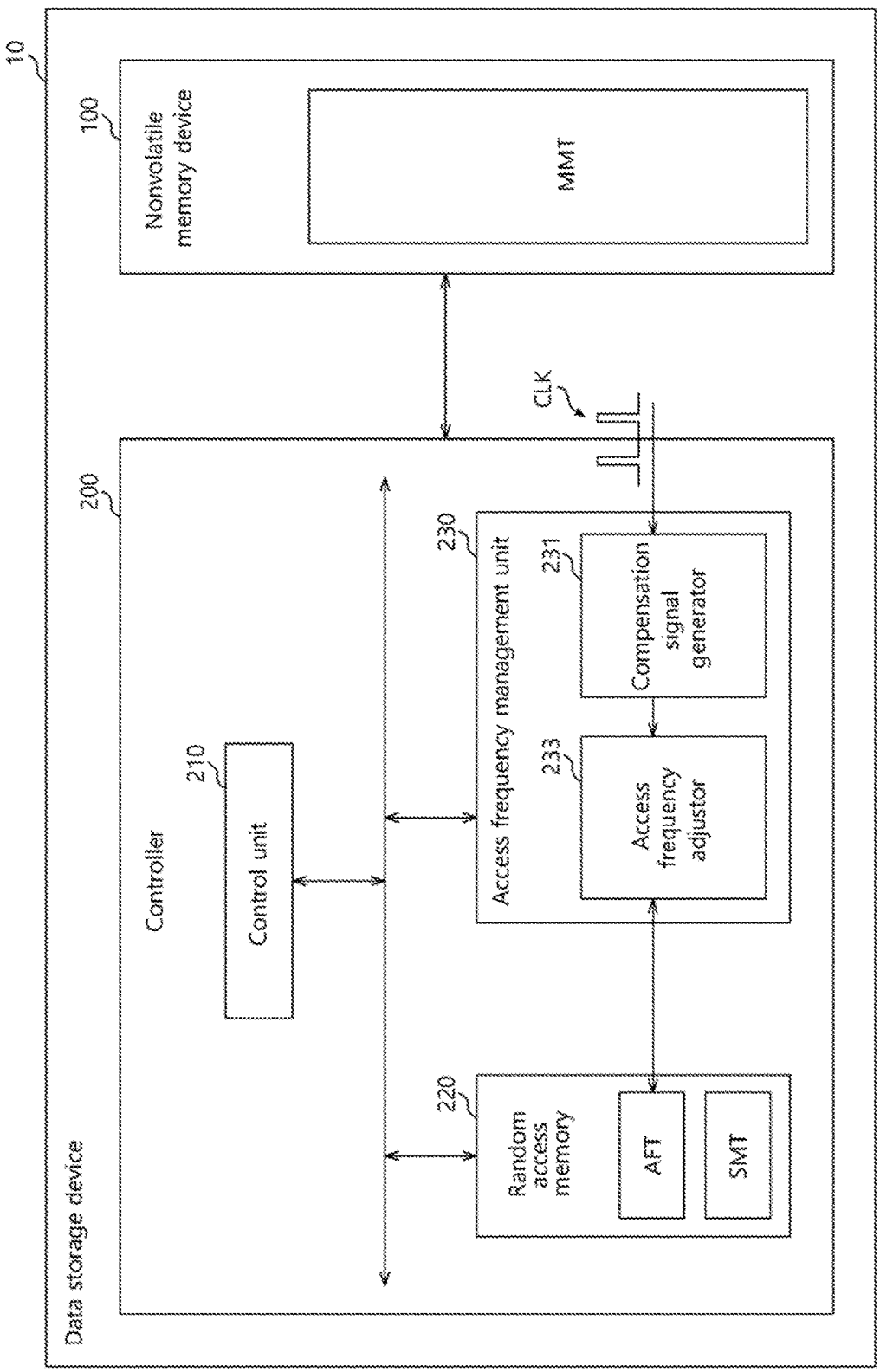
FIG. 6 is a block diagram illustrating a data storage device, according to another embodiment of the present invention.

Hereinafter, a data storage device and an operating method thereof will be described below with reference to the accompanying drawings through various examples of embodiments.

The present disclosure, however, may be embodied in various different forms, and should not be construed as being limited to the illustrated embodiments herein. Rather, these embodiments are provided as examples so that this disclosure will be thorough and complete, and will fully convey the various aspects and features of the present invention to those skilled in the art.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a data storage device 10 according to an embodiment of the present invention. FIG. 2 is a diagram illustrating an example of a main map table in the nonvolatile memory device 100 of FIG. 1. FIG. 3 is a diagram illustrating an example of a sub map table in the main random access memory 220 of FIG. 1, and FIG. 4 is a diagram illustrating an access frequency table in the sub random access memory 235 of FIG. 1.

According to the embodiment of FIG. 1, the data storage device 10 may store data to be accessed by a host device (not shown), such as, for example, a mobile phone, an MP3 player, a laptop computer, a desktop computer, a game player, a television (TV), an in-vehicle infotainment system, and the like. The data storage device 10 may also be referred to as a memory system.

The data storage device 10 may be manufactured as any one of various storage devices according to the protocol of an interface which is electrically coupled with the host device. For example, the data storage device 10 may be configured as any one of various storage devices, such as, a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and the like.

The data storage device 10 may be manufactured as any one among various package types. For example, the data storage device 10 may be manufactured as any one of various package types such as, for example, a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include the nonvolatile memory device 100 and a controller 200.

The nonvolatile memory device 100 may operate as the storage medium of the data storage device 10. The nonvolatile memory device 100 may be configured by any one of various nonvolatile memory devices, such as, a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using a chalcogenide alloy, and a resistive random access memory (Re-RAM) using a transition metal compound, according to memory cells.

The nonvolatile memory device 100 may include a main map table MMT. The main map table MMT may include address mapping information for translating or mapping logical block addresses (LBA) (hereinafter, referred to as logical addresses) access-requested from the host device, into physical block addresses (PBA) (hereinafter, referred to as physical addresses) of the nonvolatile memory device 100. The address mapping information may include logical block address to physical block address (L2P) Information and/or physical block address to logical block address (P2L) information. In the present embodiment, it is assumed, for illustration purposes, that the address mapping information include L2P information.

According to the embodiment of FIG. 2, the main map table MMT may be divided into segment units. For example, the main map table MMT may be constructed by a plurality of map table segments. In the present embodiment, it is assumed, for illustration purposes, that the main map table MMT is constructed by 20 map table segments MTSG0 to MTSG19.

Each of the map table segments MTSG0 to MTSG19 may include a plurality of L2P information. As illustrated in FIG. 2 the numbers of L2P information included in the respective map table segments MTSG0 to MTSG19 may be the same. However, we note that in other embodiments, the map table segments MTSG0 to MTSG19 may include different number of L2P information. In the present embodiment, it is assumed, for illustration purposes, that the map table segments MTSG0 to MTSG19 include the same number of L2P information.

For example, as illustrated in FIG. 2, each of the map table segments MTSG0 to MTSG19 may include k number of L2P information. Each of the map table segments MTSG0 to MTSG19 may be expressed by the number of a start logical address and adjacent logical addresses.

Some of the map table segments MTSG0 to MTSG19, for example, map table segments including L2P information on logical addresses which have been recently requested to be accessed or logical addresses which are frequently requested to be accessed from the host device, may be loaded in the main random access memory 220 of the controller 200. Detailed descriptions for this will be made later.

Referring again to FIG. 1, the controller 200 may include a control unit 210, the main random access memory 220, and an access frequency management unit 230.

The control unit 210 may control general operations of the controller 200. The control unit 210 may analyze and process a signal, a command or a request which is inputted from the host device. For example, when a read request and a logical address from which data are to be read are received from the host device, the control unit 210 may access the nonvolatile memory device 100 to read out data from the received logical address. Also, when a write request and a logical address, where data are to be written, are received from the host device, the control unit 210 may store data in the nonvolatile memory device 100 based on the received logical address. To this end, the control unit 210 may decode and drive a firmware, or a software loaded in the main random access memory 220. The control unit 210 may be realized in the form of a hardware or in the combined form of a hardware and a software.

The main random access memory 220 may store the firmware (or the software) which is to be driven by the control unit 210. Also, the main random access memory 220 may store data necessary for the driving of the firmware (or the software), for it example, metadata. That is to say, the main random access memory 220 may operate as the working memory of the control unit 210.

The main random access memory 220 may temporarily store data to be transmitted from the host device to the nonvolatile memory device 100 or data to be transmitted from the nonvolatile memory device 100 to the host device. In other words, the main random access memory 220 may operate as a buffer memory.

The main random access memory 220 may include a sub map table SMT. The sub map table SMT may be constructed by map table segments including L2P information on logical addresses which have been recently requested to be accessed or logical addresses which are frequently requested to be accessed from the host device. In other words, in order to quickly respond to an access request from the host device, the main random access memory 220 may store the sub map table SMT that is constructed by map table segments having a higher probability to be access-requested from the host device, among the map table segments MTSG0 to MTSG19 for the entire nonvolatile memory device 100. For example, the sub map table SMT in the main random access memory 220 is constructed by some map table segments MTSG3 to MTSG7 among the map table segments MTSG0 to MTSG19 of the main map table MMT.

In this way, since the sub map table SMT in the main random access memory 220 is constructed only by some map table segments among the map table segments MTSG0 to MTSG19 of the main map table MMT, as shown in FIG. 3, the size of the sub map table SMT in the main random access memory 220 is smaller than the size of the main map table MMT in the nonvolatile memory device 100. FIG. 3 shows an example of a sub map table SMT, for illustration purposes only. We note that map table segments constructing the sub map table SMT need not be neither successive nor sequential.

Map table segments constructing the sub map table SMT may be continuously changed. For example, in the case where a map table segment corresponding to a logical address which has been recently requested to be accessed from the host device does not exist in the sub map table SMT, a map table segment having a low access frequency (e.g., a low probability to be access-requested) among the map table segments constructing the sub map table SMT may be erased, and the map table segment corresponding to the logical address which has been recently requested to be accessed from the host device may be newly stored in the erased empty region.

Namely, in order to quickly respond to an access request from the host device, the sub map table SMT may be continuously updated to add map table segments having high access request probabilities. For efficiently updating the sub map table SMT, the real time access frequencies for respective map table segments may be calculated.

Referring again to FIG. 1, the access frequency management unit 230 may manage real time access frequencies for the respective map table segments MTSG0 to MTSG19 of the main map table MMT in the nonvolatile memory device 100. The access frequency management unit 230 may include a sub random access memory 235, an access frequency adjustor 233, and a compensation signal generator 231.

The sub random access memory 235 may include an access frequency table AFT. According to the embodiment of FIG. 4, the access frequency table AFT may include the access frequencies for the respective map table segments MTSG0 to MTSG19. While access frequencies may be expressed in a numerical form as illustrated in the present embodiment, it is to be noted that expression of access frequencies is not specifically limited to such form only.

The access frequency adjustor 233 may update access frequencies for the respective map table segments MTSG0 to MTSG19. For example, the access frequency adjustor 233 may increase or decrease access frequencies for the respective map table segments MTSG0 to MTSG19, according to an access request from the host device or a compensation signal inputted from the compensation signal generator 231. For example, the access frequency adjustor 233 may increase or decrease access frequencies for the respective map table segments MTSG0 to MTSG19, according to the latest access request from the host device.

For example, the access frequency adjustor 233 may update the access frequency for the map table segment MTSG11 as 1, the access frequency for the map table segment MTSG12 as 5, the access frequency for the map table segment MTSG13 as 6, the access frequency for the map table segment MTSG14 as 4, and the access frequency for the map table segments MTSG15 as 3, as illustrated in FIG. 4. Hereafter, as an example for illustration purposes only, a map table segment which includes an L2P information for a logical address which has been requested to be accessed from the host device will be referred to as an 'accessed map table segment.'

The access frequency adjustor 233 may update access frequencies by applying respectively different weights to an accessed map table segment, a previous map table segment, and a subsequent map table segment of the accessed map table segment. For example, the access frequency adjustor 233 may apply a first weight to an accessed map table segment, may apply a second weight smaller than the first weight to a subsequent map table segment of the accessed map table segment, and may apply a third weight smaller than the first and second weights to a previous map table segment of the accessed map table segment. However, it is to be noted that the present embodiment is not limited to the aforementioned allocation of weights. For example, the third weight may be larger than the second weight.

Moreover, in the case where an access frequency for at least one map table segment among the map table segments MTSG0 to MTSG19 exceeds a predetermined threshold, the access frequency adjustor 233 may decrease access frequencies for the entire map table segments MTSG0 to MTSG19 by an immediately previous increment, thereby preventing an overflow. The immediately previous increment may refer to an increment that is added when the at least one map table segment among the map table segments MTSG0 to MTSG19 exceeds the predetermined threshold.

Referring again to FIG. 1, the compensation signal generator 231 may be inputted with a clock signal CLK which is generated inside the data storage device 10 or inside the controller 200. The compensation signal generator 231 may generate a compensation signal at each clock signal CLK of a predetermined interval, and may output the generated compensation signal to the access frequency adjustor 233.

The access frequency adjustor 233 may decrease access frequencies for the entire map table segments MTSG0 to MTSG19 by a predetermined decrement, when the compensation signal is inputted from the compensation signal generator 231. According to this, it is possible to prevent access frequencies for the map table segments MTSG0 to MTSG19 from being infinitely increased.

FIG. 5 illustrates a process for updating access frequencies, according to an embodiment of the present invention. In an embodiment, the process of updating access frequencies may be performed according to at least one of an access request from the host device and a compensation signal inputted from the compensation signal generator 231, during a predetermined time. In FIG. 5, 'index' values 0 to 19 refer to the map table segments MTSG0 to MTSG19, 'LBA' refers to logical addresses access-requested from the host device, and 'Tick' refers to compensation signals outputted from the compensation signal generator 231 with the predetermined time interval. It is assumed, as an example, that a compensation signal 'Tick' is generated once every 5 seconds.

According to the embodiment of FIGS. 1, 2 and 5, if access for a specified logical address 10k+n (n is a positive integer including 0) is requested from the host device at a time T+1, the access frequency adjustor 233 may update access frequencies by applying the weight of 3 to the map table segment MTSG10 including an L2P information for the access-requested specified logical address 10k+n, by applying the weight of 2 to the subsequent map table segment MTSG11 of the map table segment MTSG10 and applying the weight of 1 to the previous map table segment MTSG9 of the map table segment MTSG10.

Thereafter, if an access for a specified logical address 8k+n (n is a positive integer including 0) is requested again from the host device at a time T+4, the access frequency adjustor 233 may update access frequencies by applying the weight of 3 to the map table segment MTSG8 including an L2P information for the access-requested specified logical address 8k+n, by applying the weight of 2 to the subsequent map table segment MTSG9 of the map table segment MTSG8, and by applying the weight of 1 to the previous map table segment MTSG7 of the map table segment MTSG8.

Thereafter, if a compensation signal is inputted from the compensation signal generator 231 at a time T+5, the access frequency adjustor 233 may decrease access frequencies for the entire map table segments MTSG0 to MTSG19 by a predetermined decrement (e.g., a decrement of 1). At this time, only access frequencies equal to or larger than 1 may be decreased, and access frequencies of 0 may retain 0 without being decreased to a minus value.

Thereafter, in a similar way, access frequencies may be increased in correspondence to access requests for specified logical addresses 12k+n, 13k+n, 14k+n, 15k+n and 12k+n from the host device at times T+6, T+7, T+8, T+9 and T+11, respectively, and access frequencies may be decreased in correspondence to compensation signals inputted at times T+10 and T+15. Assuming that the time T+15 is the current time, access frequencies in a current access frequency table AFT will be as shown in FIG. 5.

Referring again to FIG. 1, the control unit 210 may manage the sub map table SMT in the main random access memory 220 by referring to the access frequency table AFT in the sub random access memory 235 of the access frequency management unit 230.

For example, if access is requested from the host device for a specified logical address, the control unit 210 may determine whether a map table segment including an L2P information for the specified logical address is stored in the sub map table SMT, by scanning the sub map table SMT.

If the map table segment corresponding to the specified logical address is stored in the sub map table SMT, the control unit 210 may identify a physical address of the nonvolatile memory device 100 corresponding to the specified logical address, by referring to the sub map table SMT.

However, if the map table segment corresponding to the specified logical address is not stored in the sub map table SMT, the control unit 210 may identify a physical address of the nonvolatile memory device 100 corresponding to the specified logical address, by scanning the entirety of the main map table MMT of the nonvolatile memory device 100. At this time, since the specified logical address a logical address which has been recently requested to be accessed from the host device and is not stored in the sub map table SMT, the control unit 210 may store the map table segment including the L2P information for the specified logical address, in the sub map table SMT of the main random access memory 220, after scanning the information from the main map table MMT.

If there is no empty region in the sub map table SMT, then one of the map table segments already stored in the sub map table SMT may be first erased, and then the map table segment corresponding to the specified logical address may be stored in the erased region. To this end, the control unit 210 may determine a map table segment to erase, among the map table segments which are already stored in the sub map table SMT, by referring to the access frequency table AFT.

That is to say, the control unit 210 may erase a map table segment having the lowest access frequency among the map table segments already stored in the sub map table SMT, by referring to the access frequency table AFT, and may store the map table segment including the L2P information for the which have been recently requested to be accessed logical address, in the corresponding erased empty region. In this manner, the sub map table SMT may always be updated to include map table segments having high access frequencies based on the latest request from the host.

Referring now to FIG. 6 a data storage device 10 is provided, according to another embodiment of the present invention. In the present embodiment, detailed descriptions for contents overlapping with those of the above-described embodiment will be omitted.

According to the embodiment of FIG. 6, the data storage device 10 may include a nonvolatile memory device 100 and a controller 200.

The nonvolatile memory device 100 may include a main map table MMT.

The controller 200 may include a control unit 210, a random access memory 220, and an access frequency management unit 230. The random access memory 220 may include a sub map table SMT and an access frequency table AFT.

The access frequency management unit 230 may include a compensation signal generator 231 and an access frequency adjustor 233. The access frequency management unit 230 may update the access frequency table AFT in the random access memory 220. For example, the access frequency adjustor 233 may update access frequencies in the access frequency table AFT in the random access memory 220. Access frequencies may be updated according to at least one of an access request from a host device (not shown) and a compensation signal inputted from the compensation signal generator 231.

Figure 7:
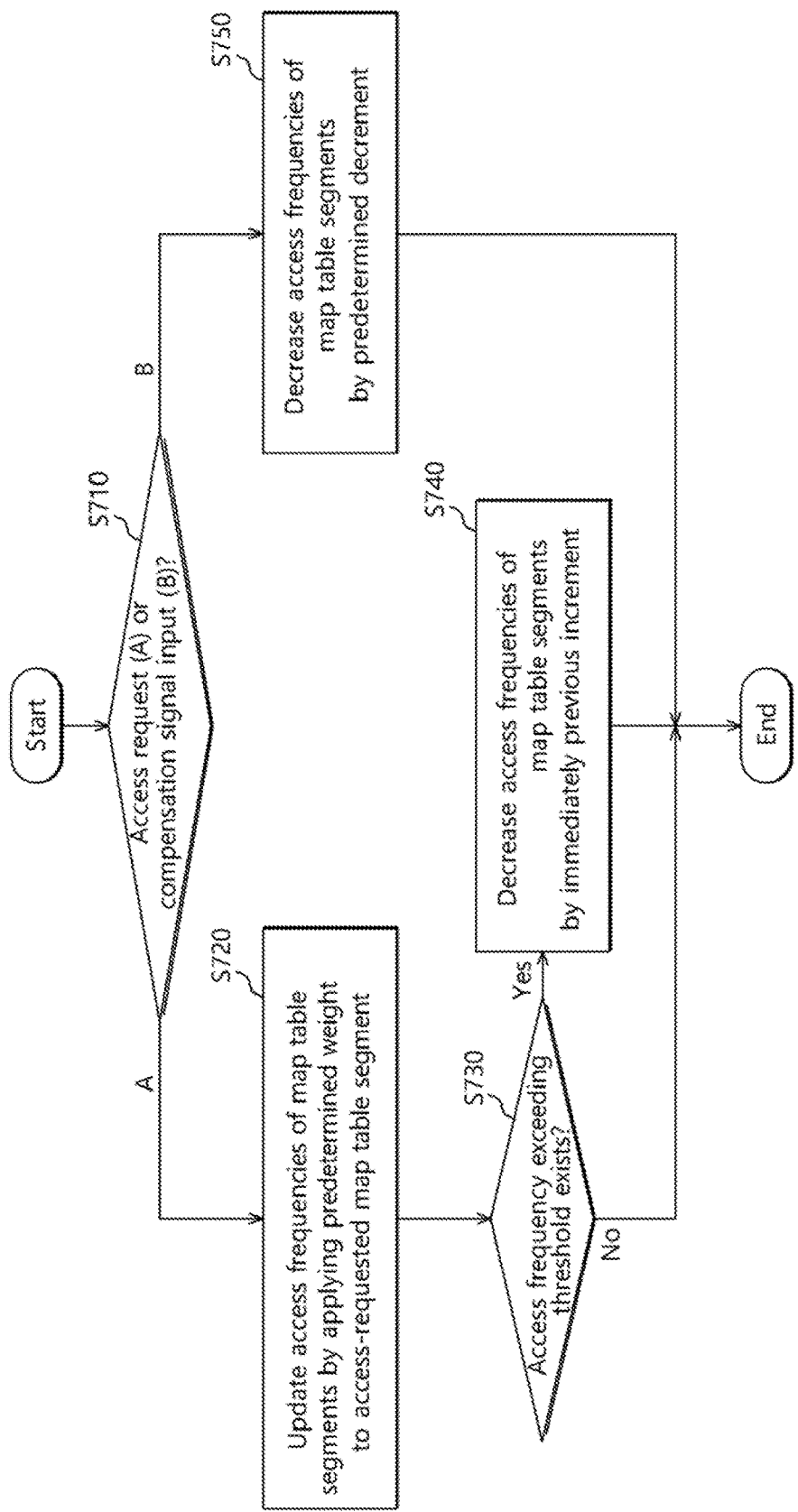
FIG. 7 is a flow chart of a method for operating a data storage device, according to an embodiment of the present invention.

FIG. 7 is a flow chart of a method for operating a data storage device according to an embodiment of the present invention. More specifically, FIG. 7 shows a method for managing access frequencies for map table segments, in the method for operating the data storage device 10 in FIG. 1 or FIG. 6.

Accordingly, at step S710, the access frequency adjustor 233 of the access frequency management unit 230 may determine whether an access is requested from a host device (A) or a compensation signal is inputted from the compensation signal generator 231 (B). If, as a determination result from step S710, an access request has been received from the host device then step S720 may be performed. At step S720, the access frequency adjustor 233 may update access frequencies for all the map table segments, by applying a predetermined weight to a map table segment including an L2P information corresponding to a logical address access-requested from the host device (hereafter, referred to as an access-requested map table segment).

The access frequency adjustor 233 may update access frequencies by applying respective predetermined weights to not only the map table segment access-requested from the host device but also to the previous and the subsequent map table segment of the access-requested map table segments. For example, a weight to be applied to the access-requested map table segment may be a first weight, a weight to be applied to the subsequent map table segment of the access-requested map table segment may be a second weight, and a weight to be applied to the previous map table segment of the access-requested map table segment may be a third weight. Also, for example, the first weight may be greater than the second weight and the second weight may be greater than the third weight.

At step S730, the access frequency adjustor 233 may determine whether there is an access frequency which is exceeding a predetermined threshold, among the access frequencies of the map table segments. As a determination result, when there is at least one access frequency which is exceeding the predetermined threshold, step S740 may be performed. Otherwise, the operation of FIG. 7 may be ended.

At the step S740, the access frequency adjustor 233 may decrease the access frequencies for all the map table segments, by an immediately previous increment. Then, the operation of FIG. 7 may be ended.

Meanwhile, if it is determined at step S710 that a compensation signal is inputted from the compensation signal generator 231, step S750 may be performed.

At step S750, the access frequency adjustor 233 may decrease access frequencies for entire map table segments, by a predetermined decrement. Then, the operation of FIG. 7 may be ended.

Figure 8:
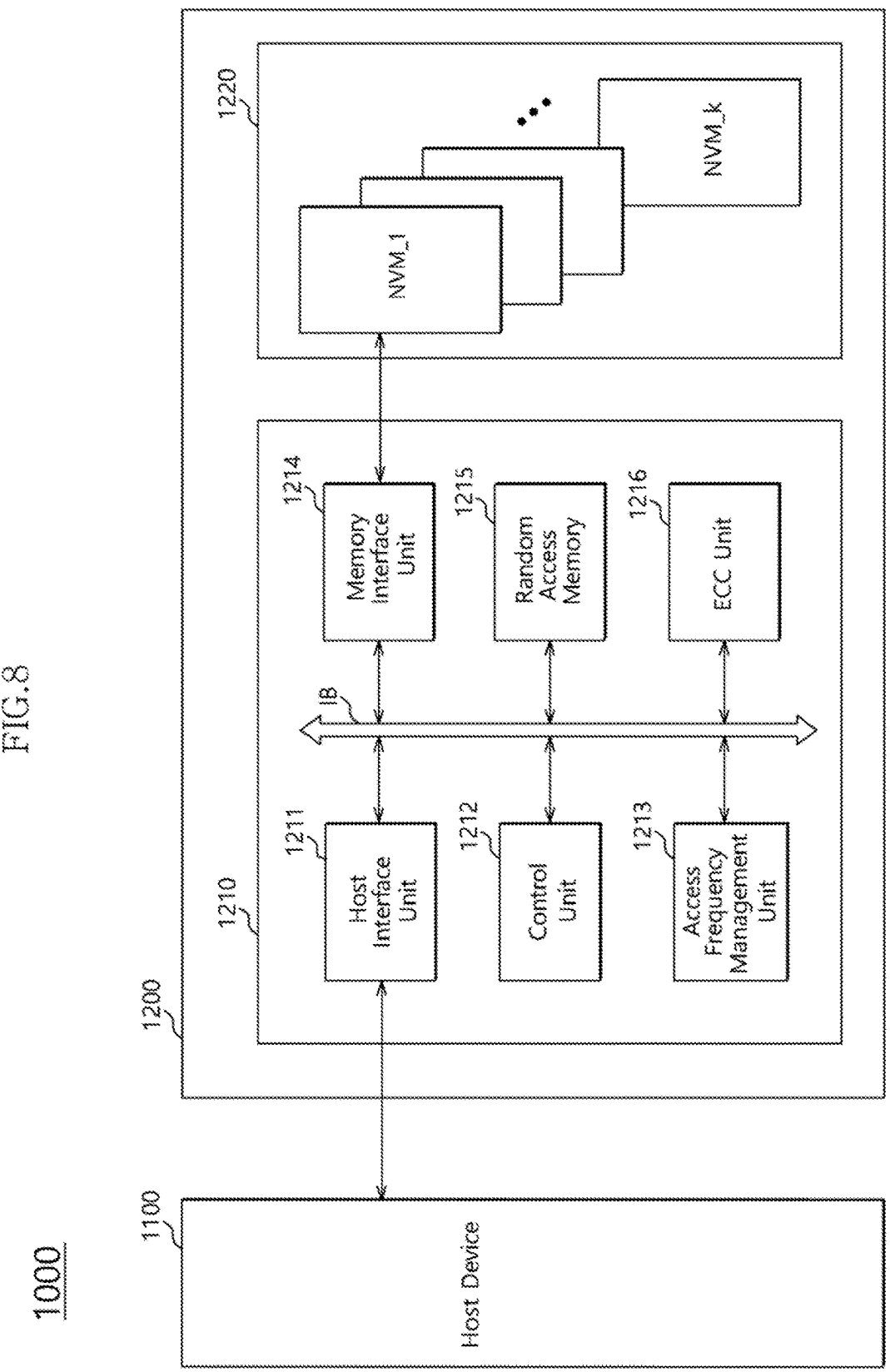
FIG. 8 is a block diagram illustrating a data processing system including a data storage device, according to an embodiment of the present invention.

FIG. 8 is a block diagram illustrating a data processing system 1000 including a data storage device 1200, according to an embodiment of the present invention.

According to the embodiment of FIG. 8, the data processing system 1000 may include a host device 1100 and the data storage device 1200.

The data storage device 1200 may include a controller 1210 and a nonvolatile memory device 1220. The data storage device 1200 may be coupled to the host device 1100 such as, for example, a mobile phone, an MP3 player, a laptop computer, a desktop computer, a game player, a TV, an in-vehicle infotainment system, and the like. The data storage device 1200 may be or Include a memory system.

The controller 1210 may include a host Interface unit 1211, a control unit 1212, an access frequency management unit 1213, a memory interface unit 1214, a random access memory 1215, and an error correction code (ECC) unit 1216 operatively linked via an internal bus IB.

The access frequency management unit 1213 may update access frequencies for respective map table segments of the nonvolatile memory device 1220.

The random access memory 1215 may be used as the working memory of the control unit 1212. The random access memory 1215 may be used as a buffer memory which temporarily stores data read out from the nonvolatile memory device 1220 or data provided from the host device 1100. Also, the random access memory 1215 may be loaded with a sub map table that is constructed by map table segments corresponding to logical addresses most recently accessed or logical addresses most frequently accessed from the host device 1100.

The control unit 1212 may efficiently manage the sub map table loaded in the random access memory 1215, by referring to access frequencies for map table segments, updated by the access frequency management unit 1213.

The host interface unit 1211 may interface the host device 1100 and the controller 1210. For example, the host interface unit 1211 may communicate with the host device 1100 through one of various interface protocols, such as, a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 1214 may interface the controller 1210 and the nonvolatile memory device 1220. The memory interface unit 1214 may provide a command and an address to the nonvolatile memory device 1220. Furthermore, the memory interface unit 1214 may exchange data with the nonvolatile memory device 1220.

The error correction code (ECC) unit 1216 may ECC-encode data to be stored in the nonvolatile memory device 1220. Also, the error correction code (ECC) unit 1216 may ECC-decode data read out from the nonvolatile memory device 1220. The error correction code (ECC) unit 1216 may be included in the memory interface unit 1214.

The controller 1210 and the nonvolatile memory device 1220 may be manufactured as any one of various data storage devices. For example, the controller 1210 and the nonvolatile memory device 1220 may be integrated into one semiconductor device and may be manufactured as any one of a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and the like.

Figure 9:
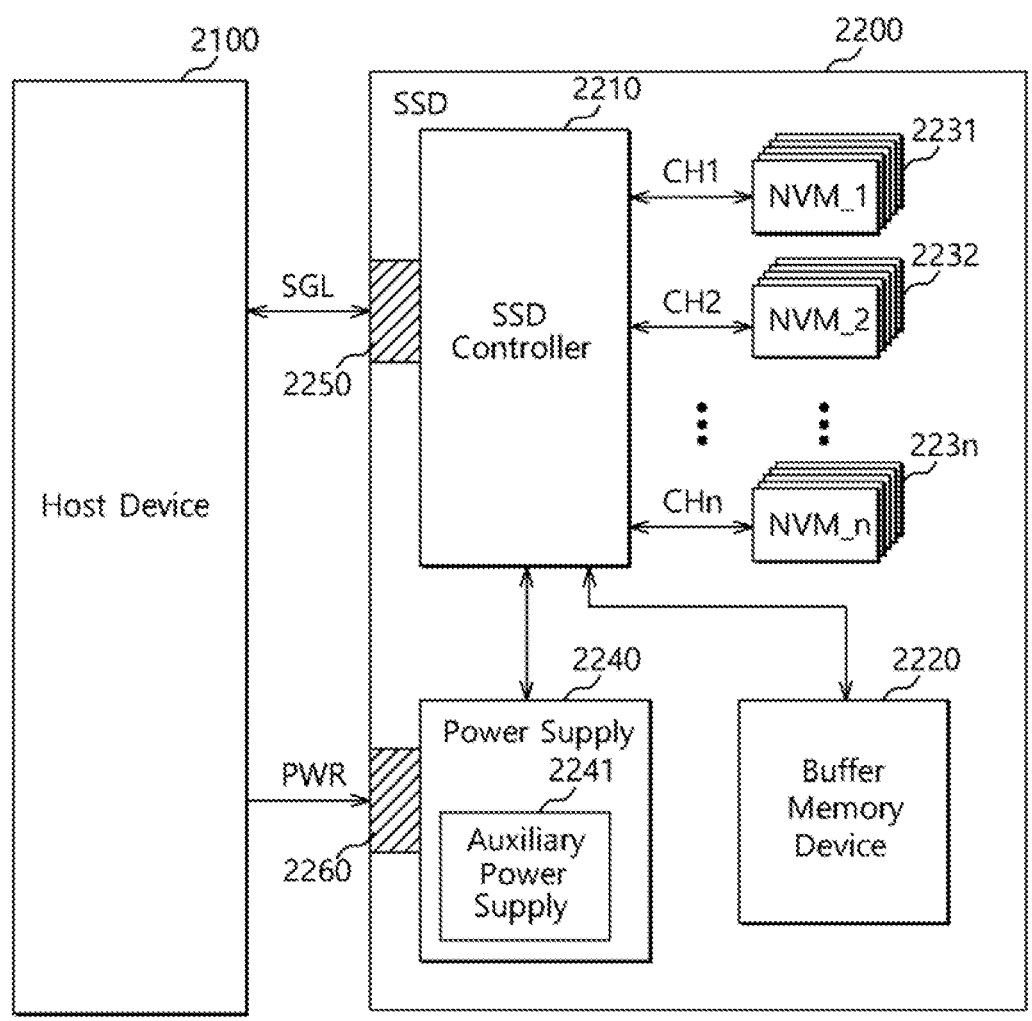
FIG. 9 is a block diagram illustrating a data processing system including a solid state drive (SSD), according to an embodiment of the present invention.

FIG. 9 is a block diagram illustrating a data processing system 2000 including a solid state drive (SSD) 2200, according to an embodiment of the invention.

According to the embodiment of FIG. 9, the data processing system 2000 may include a host device 2100 and the solid state drive (SSD) 2200.

The SSD 2200 may include an SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host device 2100 or the nonvolatile memory devices 2231 to 223n under control of the SSD controller 2210.

The nonvolatile memory devices 2231 to 223n may be used as storage media of the SSD 2200. The nonvolatile memory devices 2231 to 223n may be coupled with the SSD controller 2210 through a plurality of channels CH1 to CHn, respectively. One or more nonvolatile memory devices may be coupled to one channel. The nonvolatile memory devices coupled to each channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include capacitors with large capacitance capable of charging power PWR.

The SSD controller 2210 may exchange a signal SGL with the host device 2100 through the signal connector 2250. The signal SGL may include a command, an address, data, and the like. The signal connector 2250 may be configured by a connector, such as, for example, one of parallel advanced technology attachment (PATA), serial advanced technology attachment (SATA), small computer system interface (SCSI), serial attached SCSI (SAS), peripheral component interconnection (PCI) and PCI express (PCI-E) protocols, according to an interface scheme between the host device 2100 and the SSD 2200.

Figure 10:
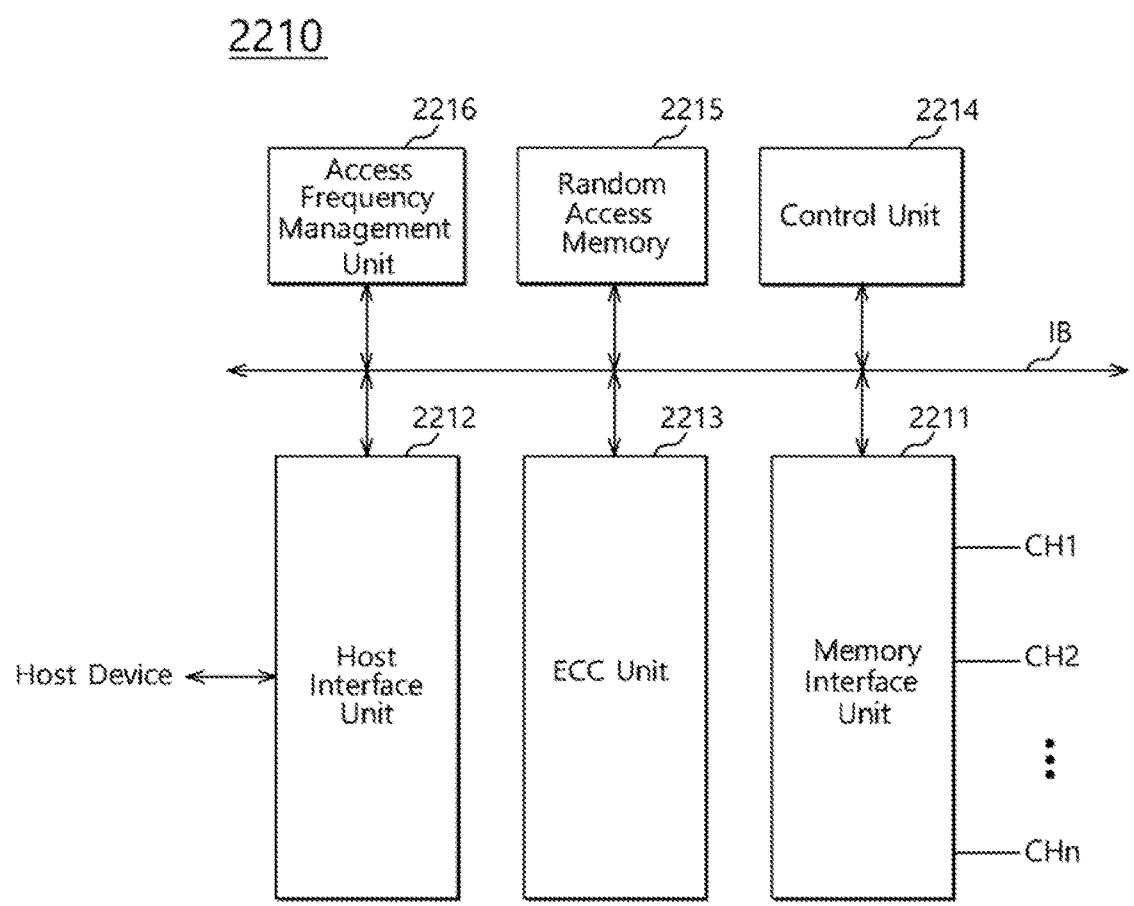
FIG. 10 is a block diagram illustrating an example of the SSD controller of FIG. 9, according to an embodiment of the present invention.

FIG. 10 is a block diagram illustrating an example configuration for the SSD controller 2210 of FIG. 9.

According to the embodiment of FIG. 10, the SSD controller 2210 may include a memory interface unit 2211, a host interface unit 2212, an error correction code (ECC) unit 2213, a control unit 2214, a random access memory 2215, and an access frequency management unit 2216 operatively linked via an internal bus IB.

The memory interface unit 2211 may provide control signals such as, for example, commands and addresses to the nonvolatile memory devices 2231 to 223n of FIG. 9. Moreover, the memory interface unit 2211 may exchange data with the nonvolatile memory devices 2231 to 223n. The memory interface unit 2211 may scatter data transferred from the buffer memory device 2220 of FIG. 9 to the respective channels CH1 to CHn, under control of the control unit 2214. Furthermore, the memory interface unit 2211 may transfer data read out from the nonvolatile memory devices 2231 to 223n to the buffer memory device 2220, under control of the control unit 2214.

The host interface unit 2212 may provide interfacing with the host device 2100 in correspondence to a certain protocol. For example, the host interface unit 2212 may communicate with the host device 2100 through any one of a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol and a PCI express (PCI-E) protocol.

In addition, the host interface unit 2212 may perform a disk emulating function of supporting the host device 2100 to recognize the SSD 2200 as a hard disk drive (HDD).

The control unit 2214 may analyze and process the signal SGL inputted from the host device 2100. The control unit 2214 may control operations of the buffer memory device 2220 and the nonvolatile memory devices 2231 to 223n according to a firmware or a software for driving the SSD 2200.

The random access memory 2215 may be used as the working memory of the control unit 2214. The random access memory 2215 may be loaded with a sub map table that is constructed by map table segments corresponding to logical addresses most recently accessed or logical addresses most frequently accessed from the host device 2100.

The access frequency management unit 2216 may update the access frequencies of respective map table segments for the nonvolatile memory devices 2231 to 223n.

The control unit 2214 may efficiently manage the sub map table loaded in the random access memory 2215, by referring to the access frequencies of map table segments, updated by the access frequency management unit 2216.

The ECC unit 2213 may generate parity data to be transmitted to the nonvolatile memory devices 2231 to 223n, among data stored in the buffer memory device 2220. The generated parity data may be stored, along with data, in the nonvolatile memory devices 2231 to 223n. The ECC unit 2231 may detect an error of the data read out from the nonvolatile memory devices 2231 to 223n. When the detected error is within a correctable range, the ECC unit 2213 may correct the detected error.

Figure 11:
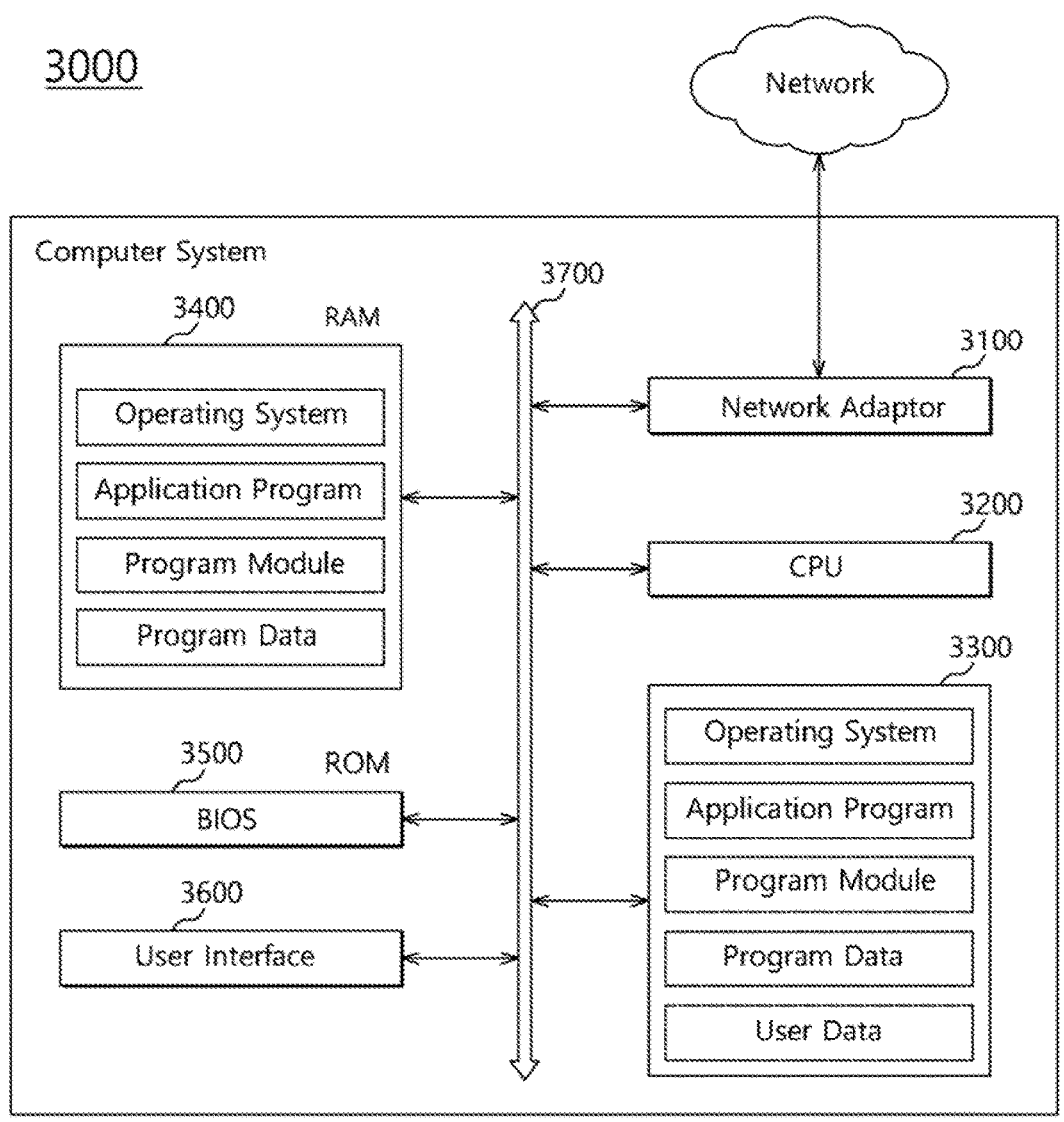
FIG. 11 is a block diagram illustrating a computer system to including a data storage device, according to an embodiment of the present invention.

FIG. 11 is a block diagram illustrating a computer system 3000 to which a data storage device 3300 is mounted, according to an embodiment of the present invention.

According to the embodiment of FIG. 11, the computer system 3000 may include a network adaptor 3100, a central processing unit (CPU) 3200, the data storage device 3300, a random access memory (RAM) 3400, a read only memory (ROM) 3500 and a user interface 3600, all of which are coupled electrically to a system bus 3700. The data storage device 3300 may be configured by the data storage device 10 shown in FIG. 1 or FIG. 6, the data storage device 1200 shown in FIG. 8 or the SSD 2200 shown in FIG. 9.

The network adaptor 3100 may provide interfacing between the computer system 3000 and external networks. The central processing unit 3200 may perform general calculation processing for driving an operating system residing at the RAM 3400 or an application program.

The data storage device 3300 may store general data needed in the computer system 3000. For example, an operating system for driving the computer system 3000, an application program, various program modules, program data and user data may be stored in the data storage device 3300.

The RAM 3400 may be used as the working memory of the computer system 3000. Upon booting, the operating system, the application program, the various program modules and the program data needed for driving programs, which are read out from the data storage device 3300, may be loaded in the RAM 3400.

A basic input/output system (BIOS) which is activated before the operating system is driven may be stored in the ROM 3500. Information exchange between the computer system 3000 and a user may be implemented through the user interface 3600.

Figure 12:
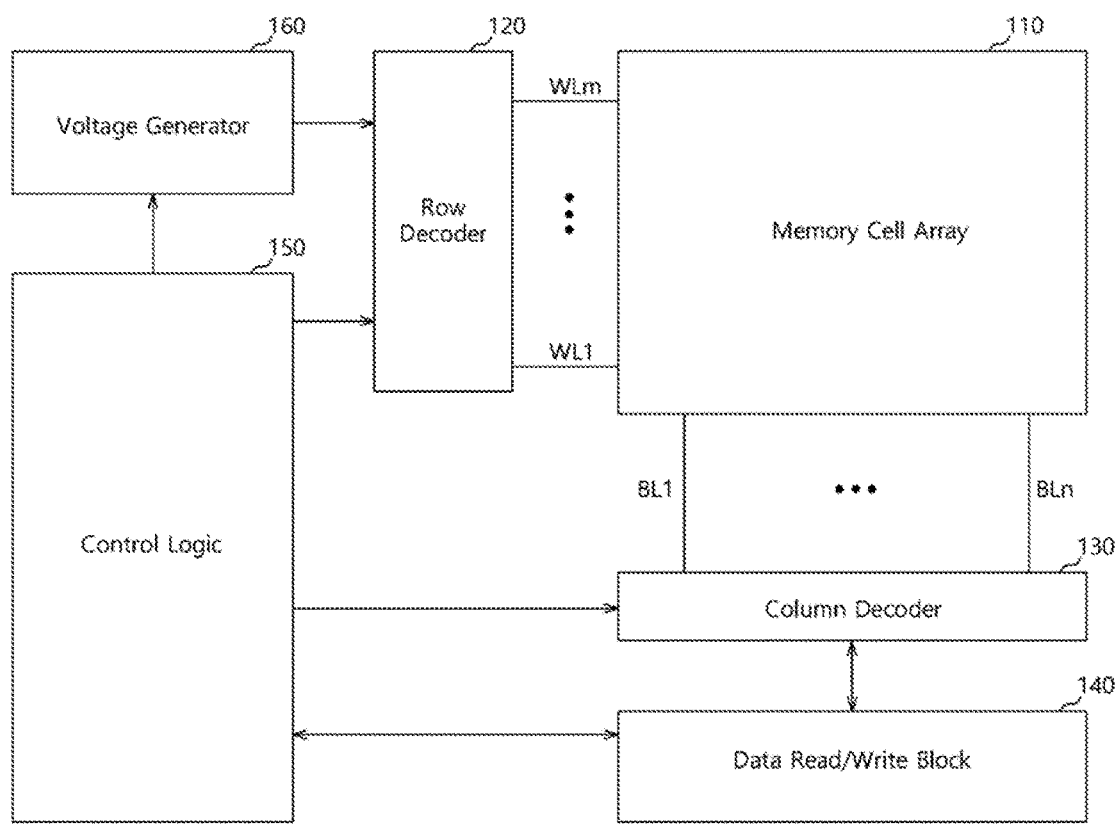
FIG. 12 is a block diagram illustrating a nonvolatile memory device included in the data storage device according to an embodiment of the present invention.

FIG. 12 is a block diagram illustrating a configuration of a nonvolatile memory device 100 included in the data storage device 10, according to an embodiment of the present invention.

According to the embodiment of FIG. 12, the nonvolatile memory device 100 may include a memory cell array 110, a row decoder 120, a column decoder 130, a data read/write block 140, a control logic 150, and a voltage generator 160.

The memory cell array 110 may include memory cells which are arranged at areas where word lines WL1 to WLm and bit lines BL1 to BLn intersect with each other. The memory cells may be grouped by an access unit, such as, for example, a memory block as an erase unit and a page as a program and read unit.

The row decoder 120 may be coupled with the memory cell array 110 through the word lines WL1 to WLm. The row decoder 120 may operate according to control of the control logic 160. The row decoder 120 may decode an address provided from an external device (not shown). The row decoder 120 may select and drive the word lines WL1 to WLm, based on decoding results. For instance, the row decoder 120 may provide a word line voltage provided from the voltage generator 160, to the word lines WL1 to WLm.

The column decoder 130 may be coupled with the memory cell array 110 through the bit lines BL1 to BLn. The column decoder 130 may operate according to control of the control logic 150. The column decoder 130 may decode an address provided from the external device. The column decoder 130 may couple the bit lines BL1 to BLn with read/write circuits of the data read/write block 140 which respectively correspond to the bit lines BL1 to BLn, based on decoding results. Also, the column decoder 130 may drive the bit lines BL1 to BLn, based on the decoding results.

The data read/write block 140 may operate according to control of the control logic 150. The data read/write block 140 may operate as a write driver or a sense amplifier according to an operation mode. For example, the data read/write block 140 may operate as a write driver which stores data provided from the external device, in the memory cell array 110 in a write operation. For another example, the data read/write block 140 may operate as a sense amplifier which reads out data from the memory cell array 110 in a read operation.

The voltage generator 160 may generate voltages to be used in internal operations of the nonvolatile memory device 100. The voltages generated by the voltage generator 160 may be applied to the memory cells of the memory cell array 110. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 150 may control general operations of the nonvolatile memory device 100, based on control signals provided from the external device. For example, the control logic 150 may control main operations of the nonvolatile memory device 100 such as, for example, read, write and erase operations of the nonvolatile memory device 100.

While various embodiments have been described above, it will be understood to those skilled in the art that the embodiments described are examples only. Accordingly, the data storage device and the operating method thereof described herein should not be limited based on the described embodiments.

It will be apparent to those skilled in the art to which this invention pertains that various changes and modifications may be made without departing from the spirit and scope of the invention as defined in the following claims

What is claimed is:

1. A data storage device comprising: a nonvolatile memory device including a main map table, the main map table including a plurality of map segments; and a controller comprising a sub map table including some map segments of the plurality of map segments of the main map table, wherein the controller is suitable for updating access frequencies for the plurality of map segments by applying different weights to each of an accessed map segment, a previous map segment having an index value immediately preceding that of the accessed map segment and a subsequent map segment having an index value immediately following that of the accessed map segment among the plurality of map segments and for determining a map segment to be erased from the sub map table based on the updated access frequencies for the plurality of map segments, and wherein the previous map segment and the subsequent map segment are non-accessed map segments;

wherein the controller includes an access frequency management unit, the access frequency management unit comprising: a sub random access memory including an access frequency table including the access frequencies for the plurality of map segments of the main map table; and an access frequency adjustor suitable for increasing the access frequencies for the plurality of map segments according to an access request from a host device.

2. The data storage device according to claim 1, wherein the access frequency management unit further comprises: a compensation signal generator suitable for generating a compensation signal with a predetermined time interval, and outputting the compensation signal to the access frequency adjustor, and wherein the access frequency adjustor decreases the access frequencies for the plurality of map segments by a predetermined decrement, according to the compensation signal.

3. The data storage device according to claim 1, wherein the access frequency adjustor applies a first weight to the accessed map segment corresponding to a logical address access-requested from the host device, applies a second weight to the subsequent map segment, and applies a third weight to the previous map segment, thereby increasing access frequencies of the accessed map segment, the subsequent map segment and the previous map segment.

4. The data storage device according to claim 3, wherein the first weight is greater than the second weight and the third weight, and the second weight is greater than the third weight.

5. The data storage device according to claim 1, wherein the access frequency adjustor decreases all access frequencies by an immediately previous increment, when at least one access frequency among the access frequencies of the access frequency table exceeds a predetermined threshold.

6. The data storage device according to claim 1, wherein each of the plurality of map segments includes a plurality of logical block address to physical block address (L2P) information.

7. The data storage device according to claim 1, wherein the controller further includes a main random access memory, the main random access memory comprising:
an access frequency table including access frequencies for the plurality of map segments of the main map table.

8. The data storage device according to claim 7, wherein the access frequency management unit comprises:
a compensation signal generator suitable for generating and outputting a compensation signal with a predetermined time interval; and
an access frequency adjustor suitable for increasing the access frequencies for each of the accessed map segment, the previous map segment and the subsequent map segment according to an access request from a host device, and decreasing the access frequencies in the access frequency table by a predetermined decrement according to the compensation signal.

9. The data storage device according to claim 1, wherein the sub map table is included in a main random access memory included in the controller.

10. A data storage device comprising: a nonvolatile memory device including a main map table including a plurality of map segments; a control unit suitable for controlling the nonvolatile memory device according to a request received from a host device; a main random access memory including a sub map table including some map segments among the plurality of map segments of the main map table; and an access frequency management unit suitable for updating access frequencies for the plurality of map segments by applying different weights to each of an accessed map segment, a previous map segment having an index value immediately preceding that of the accessed map segment and a subsequent map segment having an index value immediately following that of the accessed map segment among the plurality of map segments of the main map table, wherein the control unit determines a map segment to be erased from the sub map table, based on access frequencies for the plurality of map segments, and wherein the previous map segment and the subsequent map segment are non-accessed map segments;
wherein the access frequency management unit comprises: a sub random access memory including an access frequency table constructed by access frequencies for the plurality of map segments of the main map table; a compensation signal generator suitable for generating and outputting a compensation signal with a predetermined time interval; and an access frequency adjustor suitable for increasing the access frequencies according to an access request from the host device, and decreasing the access frequencies by a predetermined decrement based on the compensation signal.

11. The data storage device according to claim 10, wherein the access frequency adjustor decreases all access frequencies by an immediately previous increment, when at least one access frequency among the access frequencies of the access frequency table exceeds a predetermined threshold.

12. The data storage device according to claim 10, wherein the access frequency adjustor applies a first weight to the accessed map segment corresponding to a logical address access-requested from the host device, applies a second weight to the subsequent map segment, and applies a third weight to the previous map segment, thereby increasing access frequencies of the accessed map segment, the subsequent map segment and the previous map segment.

13. The data storage device according to claim 12, wherein the first weight is greater than the second weight and the third weight, and the second weight is greater than the third weight.

14. The data storage device according to claim 10, wherein the main random access memory further includes an access frequency table including access frequencies for the plurality of map segments of the main map table.

15. The data storage device according to claim 14, wherein the access frequency management unit comprises:
a compensation signal generator suitable for generating and outputting a compensation signal with a predetermined time interval; and
an access frequency adjustor suitable for increasing the access frequencies according to an access request from the host device, and decreasing the access frequencies by a predetermined decrement based on the compensation signal.

16. A method for operating a data storage device including a nonvolatile memory device which includes a main map table including a plurality of map segments and a controller which controls the nonvolatile memory device, the method comprising: determining whether an access is requested from a host device; and updating access frequencies for the plurality of map segments by applying different weights to each of an accessed map segment, a previous map segment having an index value immediately preceding that of the accessed map segment and a subsequent map segment having an index value immediately following that of the accessed map segment among the plurality of map segments, when the access is requested from the host device, wherein the previous map segment and the subsequent map segment are non-accessed map segments;
wherein the updating of the access frequencies comprises:
applying a first weight to the accessed map segment;
applying a second weight to the subsequent map segment; applying a third weight to the previous map segment; and increasing access frequencies of the accessed map segment, the subsequent map segment and the previous map segment.

17. The method according to claim 16, wherein the first weight is greater than the second weight and the third weight, and the second weight is greater than the third weight.

18. The method according to claim 16, further comprising: decreasing all the access frequencies, when at least one access frequency exceeding a predetermined threshold exists among the access frequencies or when a compensation signal is inputted.

* * * * *